April 15, 1958     R. A. MAHLMEISTER     2,830,571
MACHINE TOOL
Filed Feb. 4, 1954                              6 Sheets-Sheet 1

INVENTOR.
R. A. Mahlmeister
BY Edward T. Noie Jr.
atty

April 15, 1958  R. A. MAHLMEISTER  2,830,571
MACHINE TOOL

Filed Feb. 4, 1954  6 Sheets-Sheet 2

INVENTOR.
R. A. Mahlmeister
BY
Edward J. Noif
atty.

INVENTOR.
R. A. Mahlmeister
BY Edward J. Noif
atty.

United States Patent Office 2,830,571
Patented Apr. 15, 1958

2,830,571

MACHINE TOOL

Raymond A. Mahlmeister, Dayton, Ohio, assignor to The Cimatool Corporation, Dayton, Ohio, a corporation of Ohio Application February 4, 1954, Serial No. 408,257

21 Claims. (Cl. 125—11)

This invention relates to a method of and an apparatus for forming ribbed members.

It is an object of this invention to provide a method of and an apparatus for forming a rotating ribbed member by means of the same cutting element brought into contact with the member to perform a forming operation thereon during progressive tool movements in both directions along the axis of rotation of the member and in which timing adjustmnts are made in the tool actuating structure whereby timing is perfectly coordinated and the tool is precisely directed during its progressive movements in both directions.

It is a further object of this invention to provide a method of and an apparatus for adjusting the relative timing between two interdriven motion systems controlling the movements of a forming tool during progress in forward and reverse directions, whereby timing adjustments can be made wherever expedient in such systems for particular forming operations as desired and corrective compensation can be made in systems having lost motion in the interdrive.

It is a further object to provide a method and an apparatus wherein a measured amount of lost motion is added to the lost motion inherent in the drive between two drivingly interconnected motion systems which control a tool movement in a cyclic manner so that upon reversal in the direction of one of these motion controlling systems the error in timing that would otherwise result due to the inherent lost motion is compensated for.

It is a further object to provide an apparatus wherein a work forming tool is traversed in forward and reverse directions along the axis of a rotating member and during each direction of traverse is reciprocated repeatedly toward and from the axis of the member by one of a pair of cams which is rotated a number of revolutions during each traverse movement to give a precisely repeated form across the member, selectively operable follower means being provided whereby the cams are switched upon reversal of the direction of traverse.

It is a further object to provide such an apparatus wherein follower contacts are provided, one for each cam, and a common follower actuating means carries and actuates the follower contacts for selection of a particular cam during traverse in each respective direction in a reliable and precise manner.

It is a further object to provide such an apparatus wherein each of the follower contacts is brought into association with its respective cam upon a movement in the direction of rotation of the adjacent cam face and is held in position at least in part by the friction between the cam surface and the follower contact.

It is a further object to provide a reversible traverse drive wherein a pair of opposed contacts in each respective direction of traverse drive are engaged for traverse in that direction, one of the opposing contacts being adjustable to vary the amount of lost motion in the traverse drive upon reversal.

It is a further object to provide such traverse drive wherein the inner contact of each pair of contacts is at one end of a rotatable lead screw, each opposing pair of contacts engaging for traverse in point contact on the axis of rotation of the lead screw for uniform traverse drive, and wherein the pair of contacts in the direction of traverse are held in engagement under fluid pressure for positive drive.

Other objects and advantages of the invention will be apparent from the following description, the appended claims, and the accompanying drawings, in which:

In accordance with the present invention a work forming tool is utilized to form or renew the surface of a rotating member. As illustrated the work forming tool is a diamond cutting element and the member is a grinding wheel. The following discussion and the illustrated mechanism primarily involve the trueing of an annularly ribbed grinding wheel by means of a diamond dressing element to provide a convenient illustration of the features of the method and apparatus of this invention.

Provision is made for moving a work forming tool through different predetermined paths as it traverses along the length of the rotating member in each direction, partially forming the member during traverse in one direction and completing the forming operation during traverse in the reverse direction.

In a preferred application of the present invention only the inward movements of the forming tool toward the axis of rotation of the member being formed are used for forming during each respective traverse movement thus providing a more positive tool control with more accurate results and a more efficient forming operation.

Where the path of the tool must be accurately directed during traverse in reverse directions and is determined by drivingly interconnected motion systems, lost motion in the tool actuating structure would tend to destroy the desired timing between the tool traverse and its inward and outward feeding movements upon reversal of traverse and make the formation of an accurate wheel form impossible unless the lost motion were removed or compensated for. In the present invention no attempt is made to remove all lost motion in the interdrive through use of involved structures but the lost motion is compensated for in a basically simple and accurate manner to give precise wheel forms.

For example, in the application to an annularly ribbed grinding wheel of thread profile involving controlling cams which rotate one revolution for each pitch distance of traverse, if the inherent lost motion were in the traverse means, reverse traverse might be delayed while the controlling cam rotates some part of a revolution. With the teaching of this invention lost motion is added to the traverse means so that reverse traverse delays while the cam performs one complete revolution, thus restoring the timed relationship when reverse traverse actually commences.

Figures 15, 16, 17, 18:
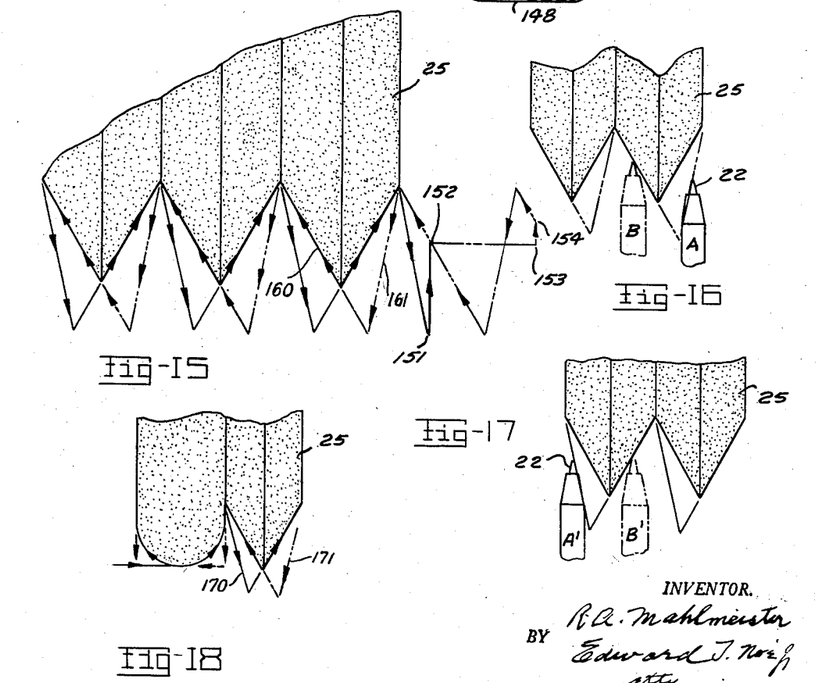
Figure 15 illustrates the path of a work forming tool such as a diamond cutting element during its traverse in each direction along a ribbed grinding wheel while partially forming the work during traverse in each direction and shows in detail the path of the tool upon reversal of traverse.
Figures 16 and 17 illustrate the tool paths in reverse directions of traverse and show the clearance of the tool relative to those rib faces which face opposite the direction of traverse movement, and the inward cutting movement along those faces which face generally in the direction of tool movement, which is a preferred application of the present method and apparatus.
Figure 18 is a fragmentary view of a member having rounded and angularly formed ribs and illustrates the application of the teachings of this invention to precisely form ribbed members of a wide range of configurations during traverse in both directions.

Figures 15–18 disclose for purposes of illustration ribbed grinding wheels and the paths which a dressing cutter would follow in dressing such wheels, partially forming the wheel during traverse in one direction and completing the formation during traverse in the reverse direction. In solid lines are shown the diamond paths for moving in one general direction along the grinding wheel axis. It will be noted in its application to a grinding wheel for grinding threads as illustrated in Figure 15 that the diamond dresses the side of the first rib facing in the general direction of cutter movement and then moves out to clear the reversely facing side of the next rib to a point where it intersects the line continuation of the side of the next rib facing in the general direction of cutter movement. Then it moves in along this line continuation and along the side of the next adjacent rib facing in the general direction of cutter movement to dress that rib side. This process is repeated until alternate rib sides facing in the general direction of cutter movement to the right in Figure 15 has been accomplished as indicated by solid line 160. The remaining rib sides would be dressed by similar movements of the dressing cutter while moving in the reverse general direction along the axis of the grinding wheel as indicated by broken line 161. Thus only the most advantageous movements of the dressing cutter are employed and a truer and better finished grinding wheel results.

In Figure 16 the dotted lines indicate the diamond path as the diamond moves relative to the grinding wheel toward the left, concurrently reciprocating in and out. In this figure the diamond at A is seen to clear the rib face and it is cutting as it moves in as shown at B. Figure 17 illustrates the diamond movement toward the right along the grinding wheel and at A' the diamond is clearing a rib face and at B' is moving in and cutting along a rib face which faces generally in the direction of traverse.

Figure 18 illustrates another exemplary rib form which combines a curved rib and a pointed rib. In dressing such a grinding wheel the dressing cutter element would move in from the left tangent to the curved section and in along its righthand face as viewed in that figure (note solid line 170). It would then retract along the solid line to clear the face of the pointed rib which faces opposite the direction of traverse and then move in to dress the rib side facing generally in the direction of traverse. The direction of traverse is then reversed to follow the dotted line path 171 to dress those rib sides or faces which were skipped during the initial traverse movement to the right.

Through application of the teachings of this invention errors due to lost motions in the forming tool actuating structure can be compensated for and the tool accurately directed during traverse in each direction, making it possible to precisely form grinding wheels through such dressing operations.

The annular surface of the grinding wheel can be dressed to almost any form depending on the configuration of the product to be ground. Such grinding wheels when properly dressed can be used to grind threads, annular forms on cylindrical pieces, to shape flat pieces as by surface grinding, and for other analogous purposes. The present invention has universal application in the dressing of grinding wheels for such purposes. For simplicity and clarity the invention has been primarily illustrated and described as applied to the dressing of a basic annular ribbed form for use in grinding threads. However, it is to be understood that the terms "rib," "rib sides" or "rib portions" as herein used are not to be construed as being limited to the form to this precise illustration.

If the work is to be ground to a thread form such as the American Standard form a topping diamond can be used to cut off the rib crests and form the necessary flats along the rib crests on the grinding wheel. The innermost root configuration on the grinding wheel is not critical and is normally determined by the shape of the diamond dressing element tip. This is because the flat thread crest on the work is formed by the outer surface of the workpiece which is cleared by the inner root of the grinding wheel in grinding such a thread form.

In the exemplary dressing unit illustrated the housing 20 is carried for sliding movements in a direction parallel to the grinding wheel axis along ways supported from a base 21. The diamond cutting element 22 is carried in a holder 23 which is carried in ways in the housing 20 for reciprocating movements in a direction toward and from the grinding wheel axis. It is the traverse movement along the grinding wheel axis and the reciprocation of the cutting element 22 and its holder 23 toward and from the grinding wheel axis which combine to determine the path which the cutting element 22 will follow and the configuration to which the grinding wheel is dressed.

Figure 1:
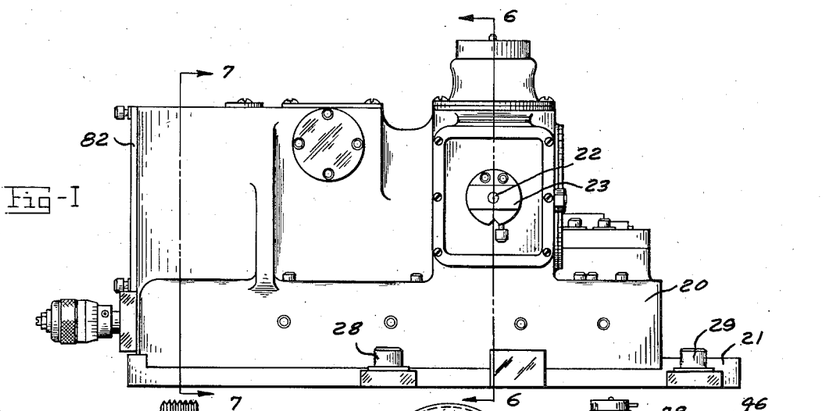
Figure 1 is a front view of an exemplary embodiment of a mechanism illustrated for the purpose of disclosing the present invention, the mechanism being in this example a dressing unit for grinding wheels.
Figures 2, 3, 4, 5:
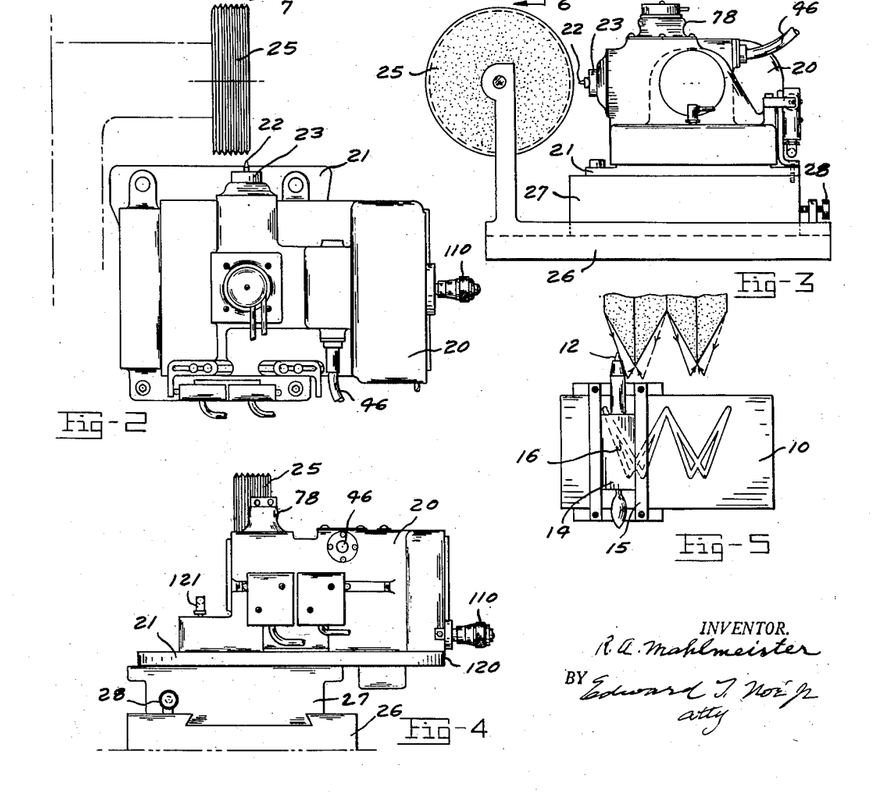
Figure 2 is a top plan view of the unit of Figure 1 showing its association with a grinding wheel.
Figure 3 is an end view of the dressing unit, its supporting structure, and the grinding wheel as viewed from the left in Figure 2.
Figure 4 is a rear view of the unit.
Figure 5 illustrates a basically simple device for dressing a grinding wheel only upon inward tool movements, in which the path of a work forming tool (a diamond cutting element in this example) is controlled in forming an annularly ribbed grinding wheel by cam grooves in a cam plate.
Figure 11:
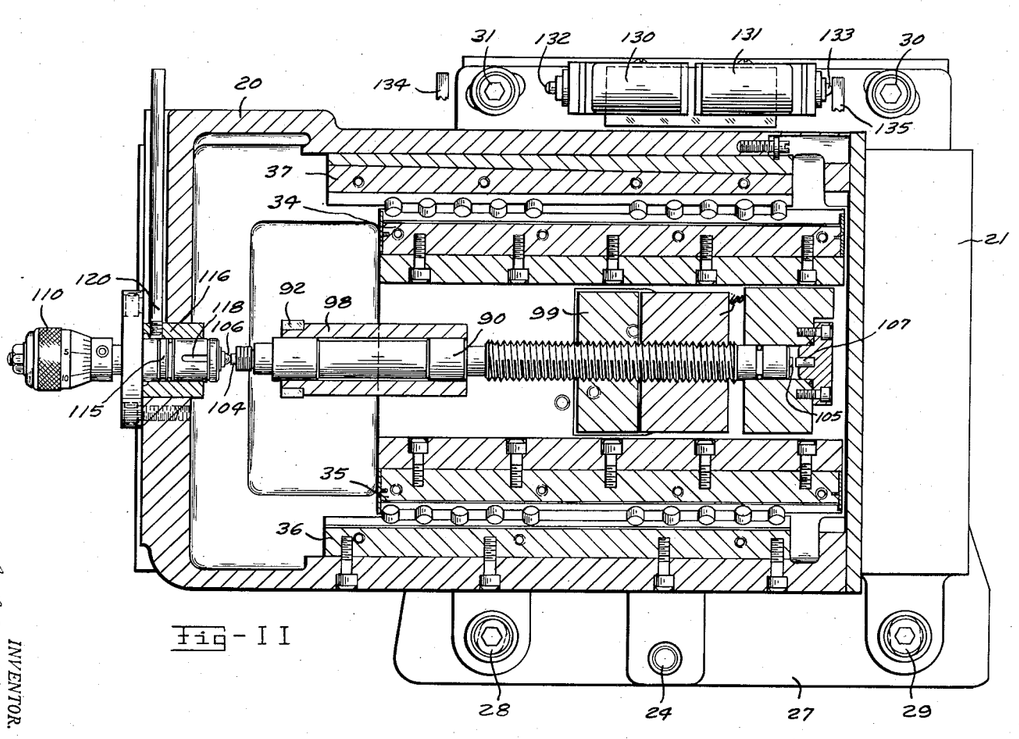
Figure 11 is a sectional view on line 11—11 of Figure 9 and illustrates primarily the traverse actuating structure and the ways which carry the upper unit components for traverse along thee grinding wheel axis in a dressing operation.

Figures 2 to 4 illustrate the general disposition of the dressing unit of this invention and its relationship to a grinding wheel 25. The base of an existing grinding machine 26 carries a member 27 which is movable toward and from the grinding wheel axis by a knurled screw 28 for bodily positioning the entire dressing unit toward and from the grinding wheel to fixed positions for different diameter wheels in setup. In Figure 11, it will be seen that the base 21 of the dressing unit is pivotally mounted about a dowel 24 and adjustments about this dowel are accomplished by release of bolts 28 to 31, the swinging of the base 21 about the dowel 24, and then the clamping of the base in position as desired.

Figure 6:
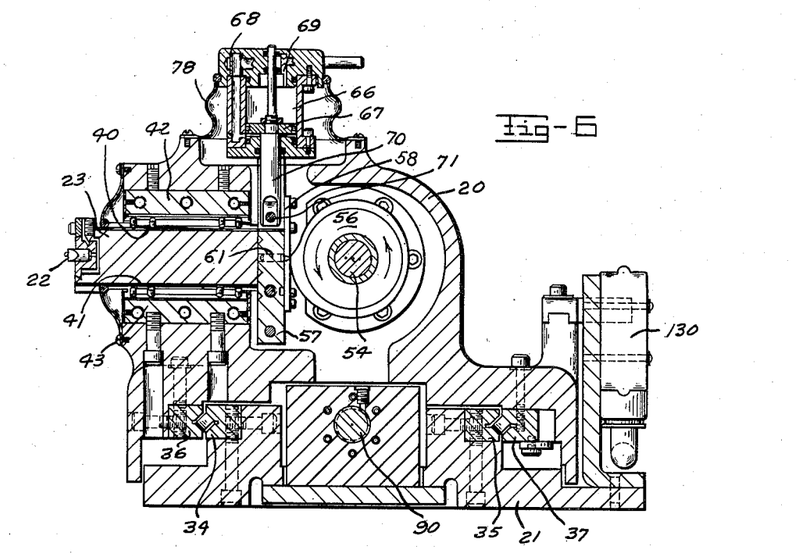
Figure 6 is a sectional view on line 6—6 of Figure 1 and illustratees the cam actuated structure for reciprocating the diamond cutting element toward and from the grinding wheel axis.
Figure 7:
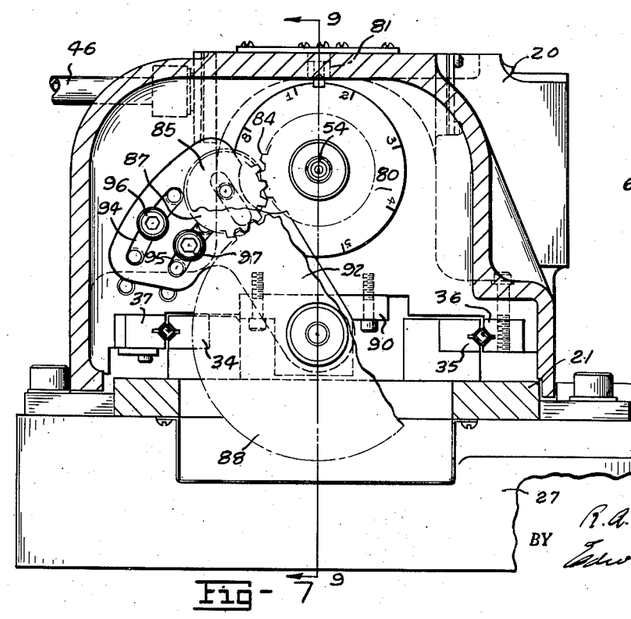
Figure 7 is a sectional view on line 7—7 of Figure 1.

The housing 20 traverses along the grinding wheel axis on rollers which roll between cooperating way components carried from the base 21 and the housing 20. As seen in Figures 6, 7 and 11, ways 34 and 35 are fixed to the base 21 and ways 36 and 37 are fixed to the housing 20. In Figure 6 are disclosed the cooperating ways which mount the holder 23 for its reciprocating movement. These ways comprise ways 40 and 41 formed in the holder 23 which cooperate respectively with ways 42 and 43 fixed to the housing 20. These ways also have rollers cooperating between each respective pair.

The drive for both the traverse and reciprocating movements is through a flexible shaft 45 carried in a conduit 46. The shaft 45 connects to a reversible electric motor mounted wherever convenient on the grinding machine. This motor is indicated at 50 in the electrical diagram of Figure 14. It will be seen in Figure 12 that this flexible shaft 45 is fixed to one end of a worm 47 carried in bearings 48 and 49 in the housing 20. The worm 47 meshes with a worm wheel 52 driving a shaft 54 journaled for rotation about an axis extending longitudinally along the upper portion of the housing 20 of the dressing unit.

Figures 9, 10:
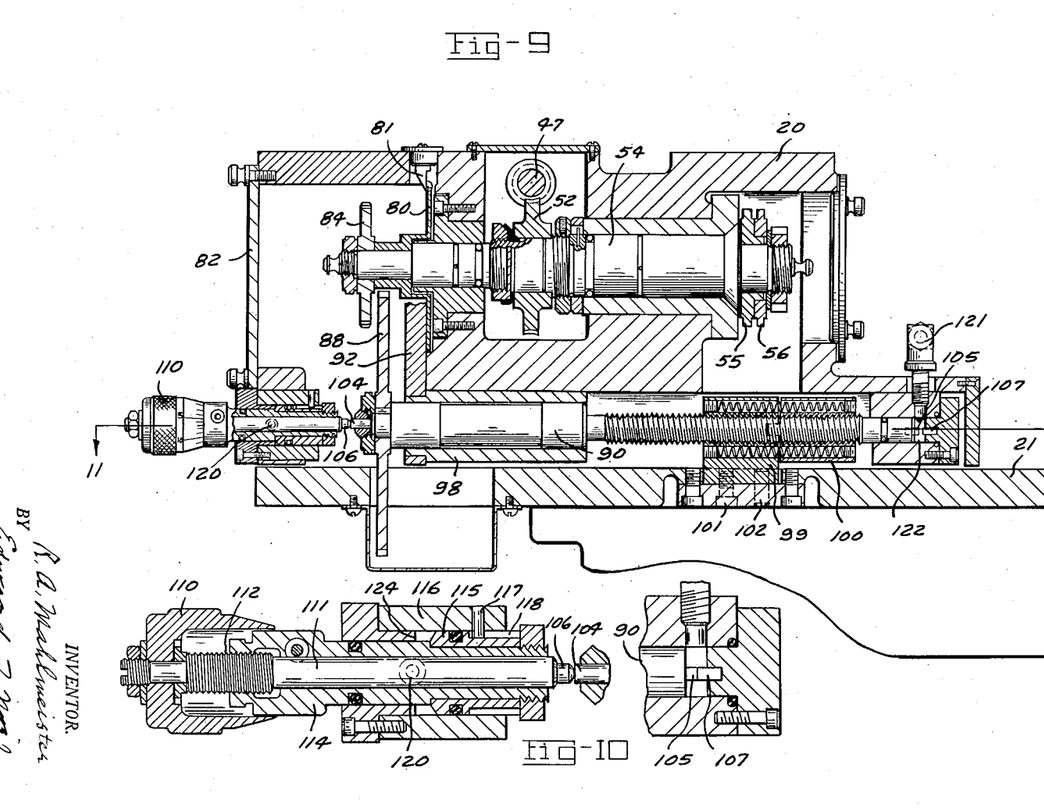
Figure 9 is a sectional view of the dressing unit taken on line 9—9 of Figure 7 and illustrates the drive structure and the lead control means for traversing the unit along the grinding wheel axis.
Figure 10 is an enlarged sectional view of certain lead screw components of Figure 9 and shows these components as they would appear if the direction of traverse of the unit as illustrated in Figure 9 was reversed.

A pair of cams 55 and 56 which actuate the cutter holder 23 for its reciprocation are fixed at the right hand end of the shaft 54 as seen in Figure 9. These cams are driven to rotate one revolution for each rib pitch of cutter traverse and will rotate several times during each traverse depending on the numbers of ribs to be dressed. This insures that the same rib form is precisely repeated across the grinding wheel. The long camming surface so provided can be accurately formed as desired for precise cutter control. It will be noted that these cams 55 and 56 are driven directly with the shaft 54 and that there are no intermediate gearing or other arrangement which would have lost motion or play in the drive to these cams.

Figure 8:
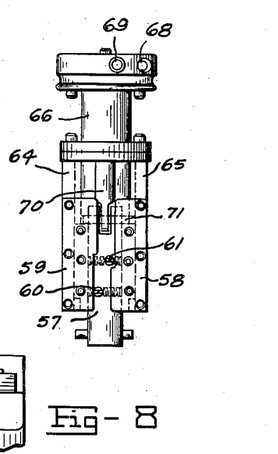
Figure 8 is a detail view of the cam selecting means.

One of the cams 55 controls the path of the cutting element 22 during traverse of the housing 20 in one direction along the grinding wheel axis and the other controls its path during the reverse traverse. A cam follower 57 is carried by the holder 23 at its rearward end for vertical movements relative thereto. The follower 57 is retained with the holder 23 and is guided for its sliding movements by plates 58 and 59 fixed to the rear end of the holder 23. As shown in Figures 6 and 8 the follower 57 is at its lowermost position. The follower 57 has two follower contacts 60 and 61 which are coplanar with the cams 56 and 55 respectively. With the follower in its lowered position contact 61 is in engagement with cam 55 (see Figure 12) and this cam 55 will control the reciprocating movements of the holder 23.

As shown in Figure 8 it is seen that each of the retaining plates 58 and 59 have notched sections along their inner facing edges which serve to limit the upward and downward movements of the follower 57 and dispose the follower contacts 60 and 61 at the proper vertical position for association with their corresponding cams. When the follower 57 is in its lowered position, follower contact 61 is in engagement with cam 55; when the follower 57 is raised, follower contact 60 moves into engagement with cam 56 and the contact 61 moves away from its cam. It should be noted that when follower contact 61 is lowered into its limited position as established by the indentation on plate 58 that cam 56 is rotating counter clockwise as seen in Figure 6 and tends to urge the contact down against this indentation thus maintaining it in its established position. When the follower 57 is raised the follower contact 60 goes up against its corresponding indentation which locates it relative to the plate 59 and the cam rotation is reversed to a clockwise rotation. Thus any frictional engagement between the contacts and cams always serves to urge the contact into its proper reference position rather than away therefrom.

Two side plates 64 and 65, as seen in Figure 8, extend upward from the rear end of the holder 23 and are fixed to the lower face of a cylinder unit 66 which is carried with the holder 23 as it reciprocates. The cylinder unit 66 contains a piston 67 which is moved to its upward or downward positions under hydraulic pressure through either of conduits 68 or 69 leading to the opposite ends of the chamber within the cylinder unit 66.

Figures 12, 13:
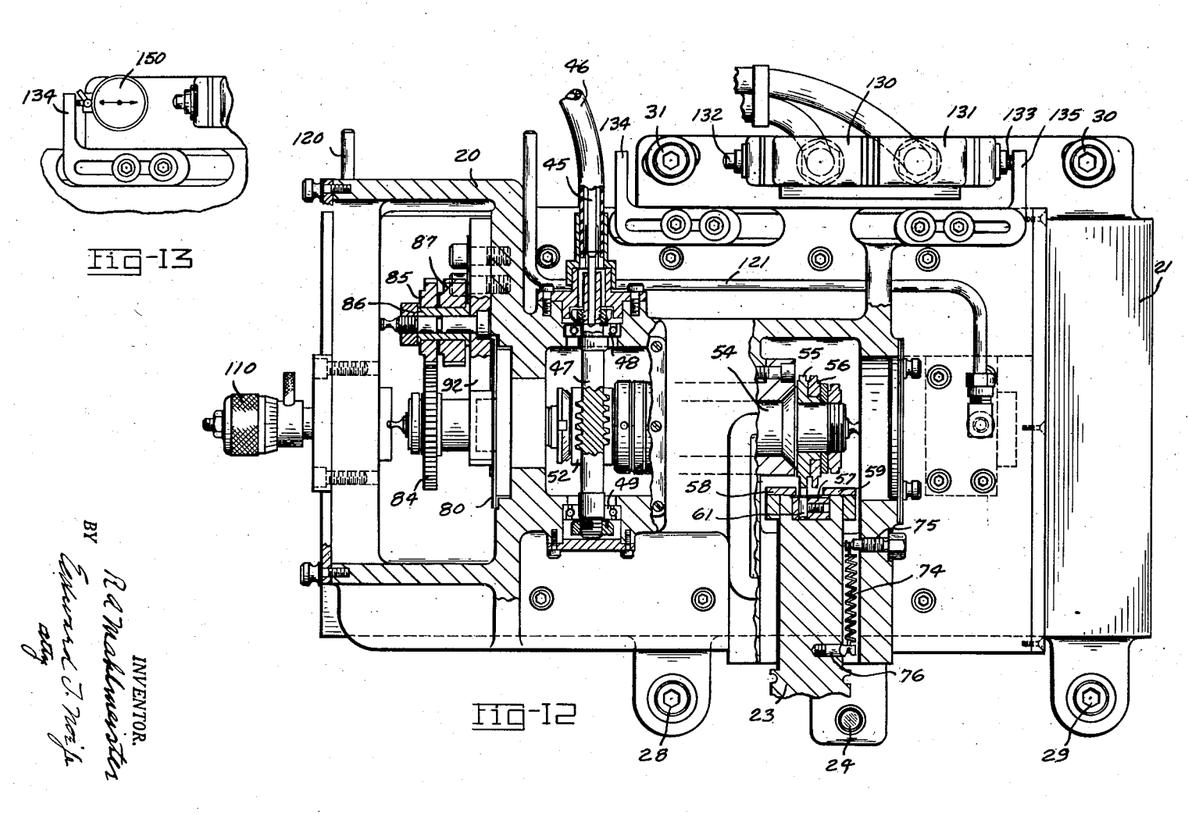
Figure 12 is a top view of the unit with portions of the housing broken away.
Figure 13 is a fragmentary view of Figure 12 illustrating the dressing unit with a dial indicator clamped thereto for use in a setup operation.

A linking member 70 is fixed at its upper end to the piston 67 and is fastened to the follower 57 at its lower end by a pin 71. Thus when the piston 67 is moved up or down one or the other of the contact followers 60 or 61 is placed in engagement with its associated cam. With this selective cam structure it is possible to have the cutting element 22 follow a different path during traverse of the housing 20 in each direction along the axis of the grinding wheel. In Figure 12 it will be seen that a spring 74 is fastened between a pin 75 fixed to the housing 20 and a pin 76 fixed to the holder 23 and urges the holder inward relative to the housing 20, maintaining the follower contacts 60 and 61 alternatively in engagement with the respective cams. A flexible boot 78 extends between the upper end of the cylinder unit 66 and the upper face of the housing 20 sealing the unit but allowing movement of the cylinder unit 66 with the holder 23 in its reciprocations.

A calibrated disc 80 is fixed to the shaft 54 adjacent its lefthand end. A reference pointer 81 is carried in the upper portion of the housing 20 in association with this calibrated disc 80. Thus by removal of the lefthand plate 82 of the dressing unit the angular disposition of cams 55 and 56 relative to the housing 20 can be seen, see Fig. 9. This disc and indicator arrangement is used in a setup operation to be later described.

The traverse movement of the housing 20 and the dressing unit components which it carries along the axis of the grinding wheel is produced by means of a lead screw carried in the lower portion of the housing 20 and threaded within a lead nut fixed to the base 21. The lead screw is driven from the lefthand end of the upper shaft 54 through change speed gearing. The gear drive is shown most clearly in Figures 7, 9 and 12. A gear 84 fixed to the lefthand end of the upper shaft 54 as seen in Figure 9 meshes with a gear 85. This gear 85 drives through a shaft 86 to a wide face gear 87 which in turn meshes with a large diameter gear 88 fixed to the lefthand end of the lead screw 90. In Figure 7 is seen an arm 92 which is pivotally mounted about the axis of lead screw 90 and which carries the shaft 86 to which are fixed the gears 85 and 87. This arm 92 can be swung about its pivot axis to various positions as determined by the length of slots 94 and 95, and the positioning of bolts 96 and 97 in threaded holes provided in the face of a wall in the housing 20. This arrangement allows the utilization of mating gears of different relative diameters for changing the speed relation between the upper cam driving shaft 54 and the lead screw 90 for different pitch wheel forms.

The lead screw 90 is journaled for rotation and for limited axial sliding in a bracket 98 fixed to the housing 20. The gear 88 affixed to the lefthand end of lead screw 90 (see Figure 9) will remain in mesh with the wide face gear 87 which it engages as the lead screw slides relative to the housing in an axial direction. The threaded portion of the lead screw 90 is threaded within a split lead nut formed of components 99 and 100 urged apart by intermediate springs. The lead-nut component 99 is fixed to the base 21 by means of attachment members including a bolt 101 and a dowel pin 102. Because the lead nut components 99 and 100 are biased apart there is no lost motion or play between the lead nut components and the lead screw 90 upon rotation of the lead screw in either direction.

At the respective ends of the lead screw 90 traverse contacts 104 and 105 are fixed thereto. An opposing contact 106 is carried in the housing 20 for engagement with the lead screw traverse contact 104 and an opposing contact 107 is fixed in the housing 20 at the other end thereof for engagement with the lead screw traverse contact 105. Thus it is seen that when the lead screw 90 is rotated it will move in one direction or the other depending upon the direction of its rotation within the fixed lead nut component 99. Its traverse contact in the direction of the movement of the lead screw will engage the opposing contact carried in the housing 20 to traverse the housing and the entire unit along the grinding wheel axis. This concurrent traverse movement combines with the cam-actuated reciprocation of the cutting element holder 23 to determine the path of the cutting element.

It will be noted that the traverse contacts at each end of the lead screw engage each other on the center line of the lead screw and in a narrow point contact. This structural relationship avoids irregularities in traverse movement as would result from relative rotation between opposing wide face contacts which are not in true radial planes relative to the lead screw or between a skewed contact surface and an eccentric contact point, or the like.

Structure later described in detail is provided in the housing 20 at each end of the lead screw to insure that the traverse contacts in the direction of traverse movement are firmly engaged. Figure 9 shows the pair of contacts 104 and 106 in engagement as they would be if the housing 20 was being traversed to the left as viewed in that figure. Figure 10 illustrates the contact arrangements in somewhat larger scale and shows the righthand contacts 105 and 107 in engagement as they would be if the housing 20 was being traversed to the right.

It will be noted upon completion of a dressing traverse in one direction that upon reversal in the direction of rotation of the driving worm 47 the rotation of cams 55 and 56 will immediately reverse. However, because the lead screw 90 is driven through an intermediate set of gears there will be a delay in the reversing of its rotation while the lost motion in the gearing system is taken up. Some means must be provided to compensate for this inherent lost motion in the device and in the present structure this has been accomplished by provision of a means for varying the amount of lost motion between the lead screw 90 and the housing carried contacts. Thus with the cams in this example rotating one full revolution during each rib pitch width of traverse if the inherent lost motion delays the reversal of traverse while the controlling cam rotates some part of a revolution additional lost motion can be adjusted into the device so traverse will delay upon reversal while the cam rotates an integral member of revolutions to restore timing when traverse in the reverse directions begins.

The adjustable lost motion structure and the pressure chambers for maintaining traverse contact are correlated in their action and the structure for carrying out these functions is shown in Figures 9 and 10 of this disclosure. It will be seen that the contact 107 at the right end of the housing 20 is fixed thereto. However, the contact 106 is adjustable by rotation of the knurled knob 110. The adjustable structure for varying the lost motion is shown enlarged and in section in Figure 10. The contact 106 is at one end of a shaft 111 which is threaded at 112 into a longitudinally extended member 114. The extended member 114 is in turn fixed to a piston 115 slidable in a cylinder 116 fixed to the housing 20. The piston 115 is held against rotation relative to the cylinder 116 by a pin 117 extending into a groove 118 in the extended portion of the piston 115. The lefthand face of the piston 115 is beveled and fluid under pressure is supplied through a conduit 120 leading to this annular beveled chamber to force the piston 115 and the cylinder 116 in opposite directions urging the housing 20 to the left and bringing the contact 107 at the righthand end of the housing 20 into engagement with the contact 105 of the lead screw 90. This relationship is shown in Figure 10 and would be the condition under which the housing would be traversed to the right.

When traverse is reversed pressure is relieved from within the cylinder 116 and pressure is supplied through a hydraulic connection 121 to a pressure chamber 122 at the right end of the housing 20. Pressure in the chamber 122 will spread the contacts 105 and 107, and with the righthand end of the lead screw 90 acting as a piston this pressure application will engage the contacts 104 and 106 at the lefthand end of the unit and force the beveled piston 115 into engagement with the lefthand end of the cylinder 116 at 124. This condition is shown in Figure 9 and is the condition which would prevail when the housing 20 is being traversed to the left.

It can readily be seen that by turning of the calibrated knob 110 the extension of the shaft 111 relative to the piston carried extended member 114 can be varied to extend or retract the contact 106 thus varying the amount of effective lost motion between the lead screw 90 and the housing carried contacts. This adjustment is used in a setup procedure which will be later described.

Switch units 130 and 131 are fixed to the dressing unit base 21 at the rear side thereof. These switch units 130 and 131 have projecting plungers 132 and 133 respectively for association with adjustable projections 134 and 135 carried from the housing 20. Thus the desired traverse in one direction or the other is determined by the adjustments of the projections 134 and 135 on the housing 20. Upon completion of traverse in one direction one or the other of the switch plungers 132 or 133, depending upon the direction of traverse, is actuated and through an electric, air, and hydraulic system later described, the rotation of the drive shaft 45 is reversed, the lead screw pressures are reversed, and the piston 67 which actuates the follower 57 is moved to replace the other of the pair of cams in controlling association with the cutting element holder 23.

Figure 14:
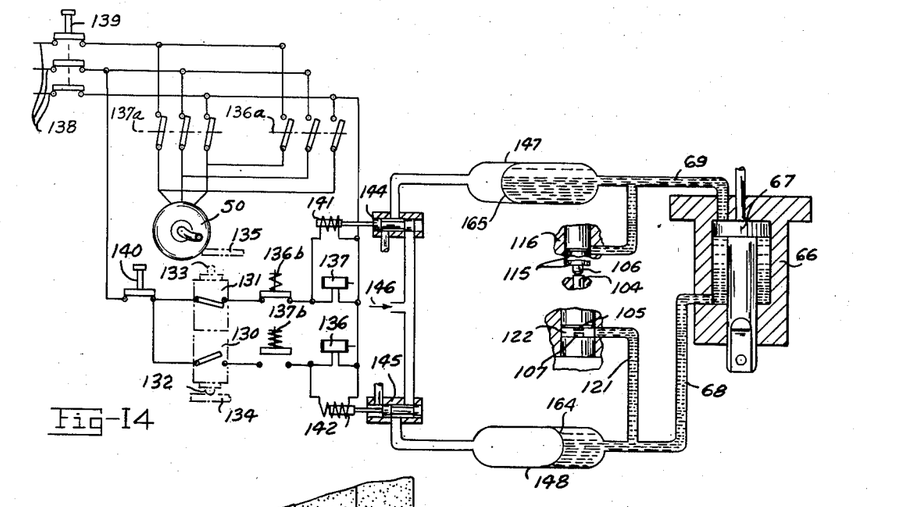
Figure 14 is a combination diagram of the electric, air, and hydraulic system which controls the dressing unit.

The electrical circuit which includes switches 130 and 131 is shown in Figure 14 in association with the air-hydraulic system which the switches control. Control relays in this figure are indicated by numerals and the switches they actuate by the same numeral with small letter subscripts. The contacts in each of the switch units 130 and 131 are separated when their respective plungers are depressed upon engagement with one of the projections carried by the housing 20 and are closed together when the projection moves away from the plunger and allows it to extend. Power is supplied through main line leads 138 and through a master switch 139 to this circuit. The reversible drive motor 50 is energized from these leads 138 and a pair of branch leads extend below to the control circuit. In the circuit condition as shown, the projection 134 carried by the housing 20 has engaged the plunger of the switch unit 130 and has opened that switch. The circuit is completed through a starter switch 140, the closed switch 131, the spring closed switch 136b, and the relay 137. The relay 137 opens switch 137b in the other control circuit rendering it ineffective. It also closes switch 137a to rotate the motor 50 in the proper direction for traverse in one direction. The solenoid 141 is energized, pulling its plunger inward and pulling the spindle in valve unit 144 to the left. The plunger in the coil 142 is extended and its valve spindle is to the right in unit 145.

Air under pressure is supplied through a connection 146. With the valve spindles in the positions shown air will flow through the valve unit 145 and to the left hand end of accumulator 148, urging its flexible diaphragm 164 to the right and exerting fluid pressure in the conduits leading from the righthand end of the accumulator 148. Fluid pressure is supplied to the chamber 122 to bias contacts 105 and 107 apart and engage contacts 104 and 106. Hydraulic pressure is also led to the lower end of the cylinder unit 66 to move the piston 67 upward and engage the follower contact 60 with the cam 56. Air is exhausted from the lefthand end of accumulator 147, through the valve unit 144 and to atmosphere and diaphragm 165 is urged to the left. Dressing during traverse in one direction then proceeds.

Upon completion of this traverse the housing carried projection 135 will engage the plunger 133 of the switch unit 131 to open it. The switch 130 has previously closed when the plunger 132 and the projection 134 separate. When the switch 131 opens relay 137 is deenergized opening switch 137a and also allowing the spring urged switch 137b to close, energizing the relay 136. Relay 136 will close contacts 136a for the reversal of the drive motor 47. Solenoid 142 will be energized and solenoid 141 deenergized moving the plungers in valve units 144 and 145 for a reverse condition of the dressing unit components. Thus upon termination of the adjusted traverse in any one direction the hydraulic components and electrical components are automatically actuated for traverse in the reverse direction.

In the setting up of the dressing unit for its dressing operation it is first necessary to determine the amount of lost motion present in the gear drive between the upper shaft 54 and the lead screw 90 in terms of traverse distance. This is accomplished by one's first rotating the knurled knob 110 to project the lefthand contact 106 until the traverse contacts are tightly in engagement and there is no lost motion present at either end of the lead screw 90. Then the dressing unit is driven to traverse in one direction (to the left, for example, in Figures 12 and 13) until all lost motion in the drive to the lead screw is taken up and the housing moves. At this time a dial indicator or any other suitable gauging device is clamped to the base 21 as shown at 150 in Figure 13 with its plunger depressed and in engagement with the lefthand housing projection 134, for example, and a first reading of the dial indicator is noted. The plate 82 of the housing is also removed and the rotational position of the disk 80 relative to the indicator 81 is also noted. Thus the position of the cams 55 and 56 in the housing 20 and the traverse position of the housing 20 are noted. The housing is then traversed further to the left as viewed in Figure 13 and the direction of drive rotation is reversed to take up the lost motion in the reverse direction. By one's watching the disk 80, the cams are returned to the same position in the housing 20 as they had when initially noted. At this point a second reading of the dial indicator 150 is taken and the difference between the first and second readings will indicate the lag in the traverse movement due to lost motion in the gear train. The amount of traverse lag is noted and, if less than one pitch width, is subtracted from one pitch width of the ribbed grinding wheel. This distance, which equals the difference between one pitch width of the grinding wheel and that of the inherent lost motion in traverse, is added to the lost motion in the traverse drive by rotation of the knurled knob 110 in a counter-clockwise direction to move contact 106 to the left as seen in Figures 9 and 10. Thus the dressing unit will traverse in one direction, the drive will be reversed, the cams 55 and 56 will immediately start rotating in the reverse direction and the lead screw pressures will be reversed. However, traverse will delay one entire pitch width (one full cam rotation) until the inherent lost motion is taken up and the lost motion that is set into the device is also taken up. These lost motions, that is the inherent lost motion plus the adjusted lost motion will equal one pitch width and the housing will dwell in its traverse until this total amount of lost motion is taken up and the desired traverse-reciprocation relationship in reverse direction is established. Once the unit has been set-up subsequent dressing operations can be carried out with assurance that the wheel will be properly formed. If the traverse lag were greater than one pitch width the lost motion would be adjusted so that traverse would dwell upon reversal while the cams rotate an integral number of revolutions and the cutter completes an integral number of reciprocations.

Figure 15 shows diagrammatically the path of the dressing cutter 22 in each direction along a multiple-ribbed grinding wheel such as would be used for grinding thread forms, using only the inward strokes for cutting. The solid line indicates the cutter path in the righthand direction and the dotted lines in the reverse direction. The dressing cutter moves in to dress those rib faces facing in the direction of traverse and travels outward to clear those rib faces which face in the other direction. The dressing cutter moves in along the side of the last rib to the right and then out along its established path. At point 151 the proper switch is engaged, and opened and the cycle is reversed. When the cam follower 54 is moved it will immediately move the holder 23 from control of one cam to the other and the cutting element will immediately drop from point 151 to point 152 on the path established by the other cam in this example. The lead screw pressures are also reversed and the housing will slide to the right from point 152 to point 153, this being the amount of lost motion which has been set into the dressing unit. At point 153 the other cam will be under control and the dressing cutter will move inward from point 153 to point 154 (with no traverse movement) while the inherent lost motion in the gear train is being taken up. At point 154 this inherent motion has also been taken up, lead screw 90 starts rotation, and the traverse will start in the reverse direction on the proper path for the cutter movement. While Figure 15 for the purpose of simplification indicates the cutter movement or reversal in a series of sequential steps, actually some of the steps occur simultaneously.

Figure 5 illustrates a basically simple apparatus which could be utilized to form a grinding wheel during tool movement in both directions along the wheel axis. As therein shown a block 10 having guiding grooves on its upper surface is mounted along the axis of a grinding wheel. A dressing cutter 12 is carried in a holder 14 mounted for sliding movements toward and from the grinding wheel axis in a guide 15 which is in turn slidable along the block 10 and along the grinding wheel. A pin 16 slides in the grooves in the upper surface of block 10 and guides the cutter 12 through a path as shown. However, whenever interdriven actuating means cooperate to determine tool movement the lost motion compensation teaching of this invention will provide precise tool control during traverse in both directions.

Through the provision of a method and apparatus for accurately compensating for lost motion, or adjusting the relative timing between drivingly interconnected reversible actuating systems as taught by this invention forming operations of the highest precision are made possible. By the provision of a unitary dressing unit having its own traverse and feeding drives a unit is provided which will have universal application and which, once set-up can be repeatedly applied to and removed from an existing machine without further adjustment. Because of the unique association between the follower contacts and feeding cams a positive and reliable cam selecting means is provided. The traverse drive contacts and their relative disposition for engagement on the center line of lead screw rotation provide a smooth and precise lead control. Through provision of the adjustable lead contact a simple and accurate adjustment of lost motion is possible. The fluid pressure traverse control insures positive and reliable traverse advance.

While the application of the method described herein and the form of apparatus herein disclosed for carrying out the method constitute a preferred application of the method and a preferred form of apparatus for carrying out the invention, it is to be understood that the invention is not limited to the precise applications or apparatus disclosed and that changes may be made therein without departing from the scope of the invention which is defined in the appended claims.

What is claimed is:

1. A method for setting up an apparatus of the character described which has interdriven traverse means movable generally along the work axis and feed means movable relative thereto generally toward and from the work axis with inherent lost motion in the drive therebetween, comprising the steps of driving the unit in one direction to take up the lost motion, noting the positions of the traverse and feed means in their respective movements, continuing drive in the same direction and reversing to take up the lost motion in the reverse direction, returning one of the inter-driven means to its previously noted position, and compensating for the error in the position of the other means by adding to the inherent lost motion present to give the desired relationship upon further traverse movements.

2. A method for setting up a dressing unit of the character described which has interdriven traverse means movable generally along the work axis and cyclically operable reciprocating feed actuating means movable relative thereto generally toward and from the work axis with inherent lost motion in the traverse means, comprising the steps of determining the amount of inherent lost motion in the traverse means upon traverse reversal, and adding sufficient lost motion to the traverse means to give a predetermined traverse dwell upon reversal while the feed actuating means completes a predetermined reciprocatory movement, thus compensating for lost motion in the traverse means and giving the desired traverse-feed relationship upon further traverse movements.

3. A method for setting up a dressing unit of the character described which has interdriven traverse means movable generally along the work axis and cyclically operable reciprocating feeding means movable relative thereto generally toward and from the work axis with inherent lost motion in the traverse means comprising the steps of driving the unit in one direction until the inherent lost motion is taken up and traverse takes place, stopping drive and noting the traverse position and the position of the feeding means in their respective movements, continuing drive in the same direction and reversing the drive to take up lost motion in the reverse direction, bringing the feeding means to its previously noted position from the reverse direction, noting the delay in traverse due to inherent lost motion, and adding lost motion in the traverse means to give a traverse delay upon drive reversal while the feeding means performs an integral number of cyclic reciprocations.

4. A method for dressing a rotating annularly ribbed grinding wheel of thread profile section comprising the steps of progressively traversing a dressing cutter in one direction along the axis of rotation of the grinding wheel while cyclically feeding the dressing cutter toward and from the grinding wheel axis through one cyclic feeding movement during each pitch distance of progressive traverse movement to engage and partially dress each rib during the cutter traverse in said one direction, reversing the cyclic feeding movement upon completion of a traverse in one direction, delaying the reverse progressive traverse movement a predetermined amount and then progressively traversing the dressing cutter in the reverse direction while cyclically feeding the cutter toward and from the grinding wheel axis to complete the dressing of the ribs during traverse in the reverse direction.

5. A method for dressing a rotating annularly ribbed grinding wheel of thread profile section comprising the steps of progressively traversing a dressing cutter in one direction along the axis of rotation of a grinding wheel while cyclically feeding the dressing cutter toward and from the grinding wheel axis through one cyclic feeding movement during each pitch distance of progressive traverse movement to engage and dress those rib sides facing in a general direction of cutter progress upon inward cutter movements toward the axis of the grinding wheel and to clear the oppositely facing rib sides on outward cutter movements, reversing the cyclic feeding movement upon completion of a traverse in one direction, delaying the reverse progressive traverse movement while an integral number of cyclic feeding movements takes place and progressively traversing the dressing cutter in the reverse direction while cyclically feeding the dressing cutter to engage and dress the previously cleared rib sides facing in the direction of reverse progress upon inward cutter movements toward the grinding wheel axis and to clear the previously dressed rib sides.

6. Dressing apparatus for forming a rotating member comprising, a work forming tool, means supporting said work forming tool for movement in a work forming operation, means for directing said work forming tool in predetermined paths during progress of the tool in one direction and its return in the reverse direction, said directing means comprising a first actuating means operatively connected to said work forming tool for moving the tool through cyclically repeated actuations during its progressive movements to thus control its movement in one component of its progress, a second actuating means operatively connected to said work forming tool for traversing said tool in each direction of progress, the first and second actuating means cooperating to control the path of movement of the work forming tool in its forming operation, drive means operatively connected to said first and second actuating means including a reversible timing connection to said second actuating means, and means to adjust the timing between the first and second actuating means to delay traverse movement while the first actuating means performs a predetermined actuation upon reversal of the drive means to precisely direct the work forming tool in its predetermined paths during its progress in both directions.

7. For use in a machine tool having a work support, a work forming tool, means supporting said work forming tool for movement in a work forming operation, means for directing said work forming tool in predetermined paths during progress of the tool in one direction and its return in the reverse direction, said directing means comprising a first actuating means operatively connected to said work forming tool for moving the tool through cyclically repeated actuations during its progressive movements to thus control its movement in one component of its progress, a second actuating means operatively connected to said work forming tool for traversing said tool in each direction of progress, the first and second actuating means cooperating to control the path of movement of the work forming tool in its forming operation, drive means operatively connected to said first and second actuating means including a reversible timing connection to said second actuating means having inherent lost motion tending to destroy the timing between the actuating means upon reversal of the timing connection, and means to add lost motion in said timing connection to delay traverse movement while the first actuating means performs an integral number of complete cyclic actuations upon reversal of the timing connection to maintain the desired timing relationship between the actuating means.

8. A dressing apparatus for multiple-ribbed grinding wheels comprising a dressing cutter, traverse means operatively connected to said dressing cutter to traverse said cutter along the grinding wheel axis, feed means operatively connected to said dressing cutter for reciprocating said dressing cutter toward and from the grinding wheel axis to dress only those rib sides which face in the direction of traverse upon inward cutter movement and traverse in one direction and dress only the rib sides facing in the opposite direction with inward cutter movements and traverse in the reverse direction, a reversible drive means for the traverse and feed means, timing means between the traverse and feed means having inherent lost motion, and an adjustable means in said unit to compensate the effective lost motion and give the desired traverse and feed relationship.

9. A dressing unit for performing a dressing operation upon the rib sides of a multiple-ribbed grinding wheel upon traverse along the grinding wheel axis in both directions comprising a dressing cutter, cam actuated feed means operatively connected to said dressing cutter to cyclically reciprocate said cutter toward and from the grinding wheel axis, lead screw traverse means operatively connected to said dressing cutter to concurrently traverse the cutter along the grinding wheel axis, reversible drive means connected to said cam actuated feed means and said lead screw traverse means having inherent lost motion, and means to add to said lost motion to cause the dressing unit to dwell in its traverse movement upon drive reversal while the cam actuated feed means performs an integral number of reciprocations thus giving the desired time relationship between the cam actuated feed means and the dressing unit traverse upon traverse in both directions and compensating for the lost motion in the timing connection.

10. A dressing unit for ribbed grinding wheels comprising a dressing cutter, means carrying said cutter for concurrent traverse movement parallel to the grind wheel axis and reciprocatory movement toward and from the grinding wheel axis, a pair of cams for reciprocating said dressing cutter, traverse means, reversible drive means connected to said traverse means and said cams including a timing connection therebetween for rotating said cams one revolution for each rib pitch of traverse movement, said timing connection having inherent lost motion, control means operatively connected to said cams and said drive means for placing one of said cams in controlling association with said cutter upon dressing traverse in one direction and including means to place the second cam in controlling association with said dressing cutter upon dressing traverse in the reverse direction, and means in said unit for adding lost motion to compensate for the inherent lost motion and to give the desired cam rotation-traverse movement relationship upon dressing movements in both directions along the grinding wheel axis.

11. A dressing apparatus for a multiple-ribbed grinding wheel comprising a dressing cutter, traverse means for reversibly traversing said cutter along the grinding wheel axis, means carrying said dressing cutter in said apparatus for feeding movements toward and from the periphery of said grinding wheel, a cam shaft in interdriven relationship with said traverse means, means fixing said shaft against axial movement in the apparatus, a pair of feeding cams adjacently fixed on said shaft, a selective follower means carried in said apparatus and interposed between said dressing cutter carrying means and said cams, and actuating means operatively connected to said follower means responsive to traverse movements of said dressing cutter for actuating said follower means and switching control of the cutter feed from one cam to the other upon reversal of the direction of traverse.

12. A dressing apparatus for a multiple-ribbed grinding wheel comprising a dressing cutter, traverse means for reversibly traversing said cutter along the grinding wheel axis, means carrying said dressing cutter in said apparatus for feeding movements toward and from the periphery of said grinding wheel, a reversibly driven cam shaft in interdriven relationship with said traverse means, a pair of feeding cams adjacently fixed on said shaft, a selective follower means, means supporting said follower means from said carrying means and between said carrying means and said cams for selective movement along an axis perpendicular to the line of movement of said carrying means, a pair of follower contacts fixed to said follower means and relatively spaced along its axis of selective movement, one contact being carried in the plane of and in opposing relationship to each of said cams for selective operative engagement therewith, stop means in said apparatus for limiting the selective movement of said follower means in each direction, and actuating means operatively connected to said follower means responsive to traverse movements of said dressing cutter for actuating said follower means and switching control of the cutter feed from one cam to the other upon reversal in the direction of traverse by moving one contact into engagement with its associated cam by movement in the direction of rotation of the adjacent cam face as the other contact diseangages its associated cam, the actuating means being held against said stop means following its selective movement at least in part by the friction between the operative follower contact and its associated cam.

13. A dressing unit for ribbed grinding wheels comprising a base, a dresser support, means carrying said support from said base for traverse movement along the grinding wheel axis, a dressing cutter, means carrying said cutter in said support for reciprocatory feeding movement towards and from said grinding wheel axis, a traverse means for said dresser support, said traverse means comprising a lead screw, a first means comprising a lead nut threaded about said lead screw, and a second means comprising lead screw contact means for contacting said lead screw at its respective ends in point contact on its longitudinal axis of rotation, one of said first and second means being mounted on said base and the other being carried from said dresser support, feed means operatively connected to said dressing cutter, and drive means connected to said traverse means and said feed means.

14. A dressing unit for grinding wheels comprising a base, a dresser support, means carrying said support from said base for traverse movement along the grinding wheel axis, a dressing cutter, means carrying said cutter in said support for reciprocatory feeding movement toward and from the grinding wheel axis, a traverse means between said dresser support and said base comprising a lead nut member and a lead screw member in threaded engagement and contact means cooperating with one of said members for traverse drive, means for adjusting one of said contact means toward and from the member with which it cooperates, feed means operatively connected to said cutter, and drive means connected to said traverse means and said feed means.

15. A dressing unit for ribbed grinding wheels comprising a base, a dresser support, means carrying said support from said base for traverse movement along the grinding wheel axis, a dressing cutter, means carrying said cutter in said support for reciprocatory feeding movement towards and from said grinding wheel axis; traverse means comprising a lead screw carried from said support for axial sliding relative thereto, lead nut means mounted on said base and into which said lead screw is threaded, a pair of lead screw contact means included in said dresser support, means carrying said contact means in said support in opposing relationship to said lead screw at each end thereof for traverse contact therewith in point contact on its longitudinal axis of rotation; feed means operatively connected to said dressing cutter; and drive means connected to said traverse means and said feed means.

16. The dressing unit of claim 15 wherein one of the lead screw contact means includes means for adjusting the contact means relative to the opposing end of the lead screw, whereby lost motion can be adjusted.

17. The dressing unit of claim 15 including pressure chambers at each end of the lead screw and selectively operable pressure supply means connected to each of said chambers whereby the lead screw can be maintained in pressure engagement with the traversing contact means in the direction of traverse.

18. An apparatus of the character described comprising a work support and a support for a forming tool, means carrying said supports for relative movement, first and second actuating means operatively associated with one of said supports for causing relative movement between said workpiece and tool during a forming operation, drive means operatively connected to said first and second actuating means including a reversible timing connection therebetween having inherent lost motion tending to destroy the timing between the actuating means upon reversal of the timing connection, and adjustable means to add lost motion to that inherent in said timing connection to maintain a desired timed relationship between the first and second actuating means upon reversal of the timing connection.

19. An independently driven dressing unit adapted for mounting on a grinding machine for dressing a multiple rib grinding wheel, said unit comprising a base for mounting on the machine, a housing carried on said base for traverse movement thereon along the wheel face, a dressing tool holder supported in said housing for reciprocating movement relative thereto at an angle relative to the traverse path, a lead nut, means restraining said nut against free rotation and end-wise movement relative to said base, a lead screw supported in said housing for rotation and threaded in said lead nut, abutment means cooperating between said housing and said screw to traverse the housing upon lead screw rotation, said abutment means including cooperating contacts on said housing and at each end of the lead screw engageable for housing traverse, said contacts forming the sole axial restraint between the screw and housing, a shaft supported in said housing parallel to said lead screw, cam means on said shaft in operative association with said holder, reversible drive means operatively connected for simultaneous rotation of said shaft and said screw to direct a dressing tool along the grinding wheel for forming multiple ribs thereon and means for adjusting one of said cooperating contacts in said housing.

20. The dressing unit of claim 19 wherein said drive means includes an electric drive motor, and switch means and adjustable contacts cooperating between said housing and said base for reversal of said drive motor at adjusted limits of traverse movement.

21. An independently driven dressing unit for mounting on a grinding machine for forming a multiple ribbed grinding wheel, said unit comprising a base adapted for mounting on the machine, a unit housing carried for traverse movement along said base, a dressing tool holder carried for reciprocation in said housing at an angle to the path of traverse, a lead nut, means restraining said nut against free rotation and axial movement relative to said base, a lead screw supported in said housing and threaded in said nut, drive abutment means cooperating between said housing and said screw, a shaft rotatably mounted in said housing parallel to said lead screw, cam means on said shaft in operative association with said holder for reciprocation thereof, reversible drive means operatively connected for rotation of said shaft and said lead screw, and adjustable timing means for obtaining an infinite variation in relative timing between said shaft and said screw within a given range upon drive reversal.

References Cited in the file of this patent

UNITED STATES PATENTS

| | | |
|---|---|---|
| 802,366 | Bixby | Oct. 24, 1905 |
| 1,139,555 | Miller | May 18, 1915 |
| 1,330,881 | Lineham | Feb. 17, 1920 |
| 1,600,401 | Cockburn | Sept. 21, 1926 |
| 1,985,752 | Vogler | Dec. 25, 1934 |
| 2,007,717 | Harley | July 9, 1935 |
| 2,061,778 | Schicht | Nov. 24, 1936 |
| 2,654,291 | Snader | Oct. 6, 1953 |
| 2,663,292 | Mottu | Dec. 22, 1953 |

FOREIGN PATENTS

| | | |
|---|---|---|
| 279,646 | Great Britain | Nov. 3, 1927 |